United States Patent [19]
Ohhara

[11] Patent Number: 5,497,868
[45] Date of Patent: Mar. 12, 1996

[54] VISCOUS FLUID CLUTCH

[75] Inventor: Kenji Ohhara, Atsugi, Japan

[73] Assignee: Unisia jecs Corporation, Atsugi, Japan

[21] Appl. No.: 367,109

[22] Filed: Dec. 30, 1994

[30] Foreign Application Priority Data

Dec. 30, 1993 [JP] Japan .................. 5-076103 U

[51] Int. Cl.⁶ .................................................. F16D 35/02
[52] U.S. Cl. .................................... 192/58.4; 192/82 T
[58] Field of Search .......................... 192/58 B, 82 T

[56] References Cited

U.S. PATENT DOCUMENTS 5,404,977  4/1995  Martin et al. .................. 192/58 B

FOREIGN PATENT DOCUMENTS 59-34030  2/1984  Japan .................. 192/58 B
4-105641  9/1992  Japan .

*Primary Examiner*—Andrea L. Pitts

[57] ABSTRACT

A viscous fluid clutch includes relatively rotatable first and second drive members having a fluid shear space therebetween and which are cooperable with a fluid medium in the shear space to provide a shear-type fluid drive therebetween, a fluid reservoir for storing the fluid medium, and a baffle wall located in the reservoir for restraining flow of the fluid medium from the reservoir to the shear space.

4 Claims, 3 Drawing Sheets

VISCOUS FLUID CLUTCH

BACKGROUND OF THE INVENTION

The present invention relates to a viscous fluid clutch adapted to drive an accessory device, such as a cooling fan, for an internal combustion engine.

Japanese Utility Model Application First Publication No. 4-105641 discloses a viscous clutch adapted to drive an accessory device, such as a cooling fan, for an internal combustion engine. This known viscous fluid clutch includes relatively rotatable first and second drive members having a fluid shear space therebetween and which are cooperable with a fluid medium in the shear space to provide a shear-type fluid drive therebetween, and a fluid reservoir for storing the fluid medium. With viscous fluid clutch, in response to a rapid increase in rotational speed of the second drive member, the first drive member follows this change in rotational speed. Thus, the overshoot phenomena of the first drive member will take place when subsequently the rotational speed of the second member decreases.

An object of the present invention is to improve this known viscous clutch such that the overshoot pheneomena is avoided or at least suppressed.

SUMMARY OF THE INVENTION

According to the present invention, there is provided a viscous fluid clutch comprising:

first and second relatively rotatable drive means, said first drive means containing a fluid medium and having an operating chamber and a reservoir;

fluid shear drive means located in said operating chamber operable with said fluid medium to provide a shear-type fluid drive between said first and second drive means;

said operating chamber having an outlet opening at an outer portion and an inlet opening at an inner portion, said first drive means having passage means having an inlet connected to said outlet opening and an outlet connected to said reservoir in a zone angularly spaced from and leading said inlet opening with respect to direction of rotation of said first drive means, pump means for pumping said fluid medium from said operating chamber out of said outlet opening and through said passage means and said outlet thereof to maid reservoir; and means within said reservoir for impeding flow of said fluid medium from said outlet of said passage means to said inlet opening.

DETAILED DESCRIPTION OF THE INVENTION

Figure 1:
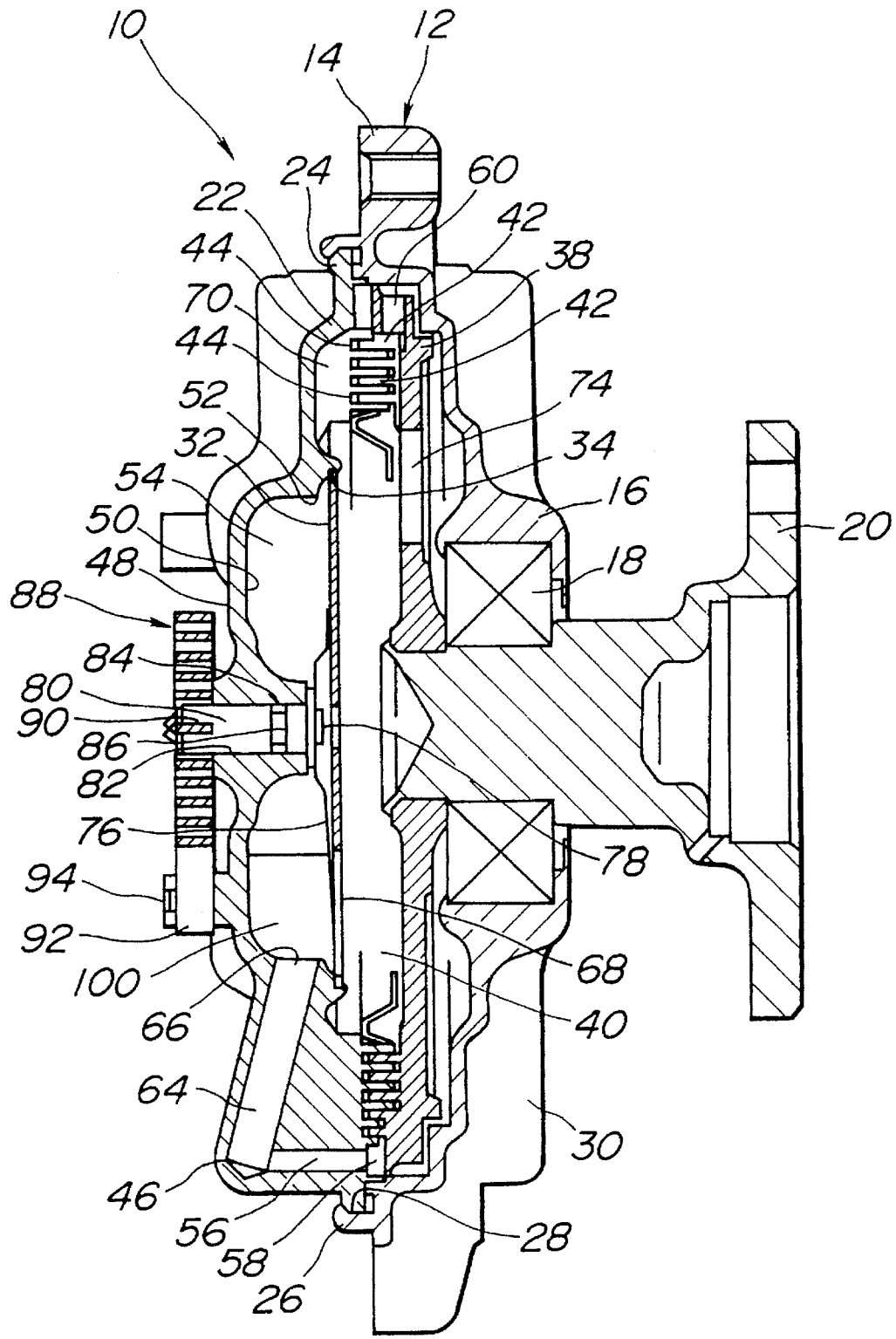
FIG. 1 is a cross-sectional view of a viscous fluid clutch embodying the present invention.

Referring to FIG. 1, a viscous fluid clutch 120 includes a housing 12 which includes a rear wall 14 having a hub 16 which is rotatably mounted by a suitable bearing 18 on a drive shaft 20. The housing 12 further includes a finned cover member or front wall 22 which has an annular flat surface 24 formed adjacent its peripheral edge, the latter being confined by an annular lip 26 in an annular recess 28 formed on the housing 12. Cooling fins 30 are formed on the outer surface of the rear wall 14. A divider wall 32 is confined in a second annular recess 34 formed on the front wall 22 radially inward of the annular recess 28. A third annular recess 36 is doemws in the rear wall 14 radially inward of the first mentioned annular recess 28 and outward of the second annular recess 34, A clutch plate 38 is secured at its center by any suitable means to the drive shaft 20. The outer peripheral portion of the clutch plate 38 is freely located in an operating chamber 40 formed by the third annular recess 36.

Adjacent portions of the clutch plate 38 and the front wall 22 are provided with torque transmitting elements consisting of cooperating annular ridge and groove elements 42 and 44, respectively, with an intervening fluid shear space therebetween to accommodate a viscous fluid as a torque-transmitting medium. The annular groove elements 44 are formed in the front wall 22 radially inward of the outer edge of the third annular recess 36 and outward of the outer edge of the second annular recess 34.

It may be noted in FIG. 1 that the front wall 22 has an axial protrusion 46 which has an outer periphery intermediate the outer edges of the annular recesses 24 and 36 and an inner periphery radially inward of the annular recess 34. The inner periphery of the axial protrusion 46 merges smoothly into a central portion 48 formed with a circular cavity 50 which has a circular peripheral edge 52 disposed radially inward of the second annular recess 34. A reservoir 54 is formed in the circular cavity 52 between the centeral portion 48 and the divider wall 32. A pump outlet opening 56 is formed in the axial protrusion 46 of the front wall 22 adjacent a pump or dam element 58 formed on the front wall 22. A plurality, three in this embodiment, of pump inlet radial openings 60 are formed in the outer periphery of the clutch plate 38 adjacent the corresponding three of six circumferentially equi-distance pump or dam elements 62 (see FIG. 3) formed in the outer periphery of the clutch plate 38. The pump inlet openings 60 communicates between the shear space and the operating chamber 40. The pump outlet opening 56 communicates between the operating chamber 40 and a return passage 64 formed in the axial protrusion 46 of the front wall 22. The return passage 64 terminates in an opening or return port 66 formed in the cylindrical wall of the circular cavity 50 (see FIG. 2 also). Thus, the opening 66 of the return passage 64 communicates with the reservoir 54.

An opening or inlet port 68 is formed in the divider wall 32, communicating between the reservoir 54 and the operating chamber 40 radially inward of the cooperating annular ridge and groove elements 42 and 44. A plurality, four in this embodiment, of radial cutouts 70 are formed on the front wall 22 radially outward of the outer edge of the second annular recess 34 and radially inward of the pump or dam element 58 (see FIG. 2). The radial cutouts 70 communicate between the intervening fluid shear space between the ridge and groove elements 42 and 44 and the operating chamber 40 radially inward of the ridge and groove elements 42 and 44. An annular baffle plate 72 is secured at its outer peripheral edge to the front wall 22 and disposed adjacent the radial inward edges of the radial cutouts 70. The annular baffle plate 72 has a conical bend intermediate the outer and inner peripheral edges thereof. The conical bend of the annular baffle plate 72 is disposed radially inward of the ridge and groove elements 42 and 44 and radially outward of the inlet port 68. The clutch plate 38 is apertured at 74 disposed radially inward of the ridge element 42 thereof.

The inlet port 68 is closed by a valve member 76. The valve member 76 is secured at a portion intermediate the center and its innermost edge to a reduced diameter portion 78 of a center pin or shaft 80, which is rotatably mounted in a central opening 82 formed in the front wall or cover member 22. A seal ring 84 is mounted in an annular groove 86 formed in the center pin 80 to prevent leakage therepast. A helically wound, bimetallic thermostatic valve control element 88 is provided with an inwardly extending end portion 90 which is mounted in a transverse slot formed in the center pin 80. An outwardly extending end portion 92 of the bimetallic element 88 is secured to a post 94. With this arrangement, a change in an ambient temperature either winds or unwinds the bimetallic element 88, resulting in rotation of the center pin 80 and the valve member 76.

Figure 2:
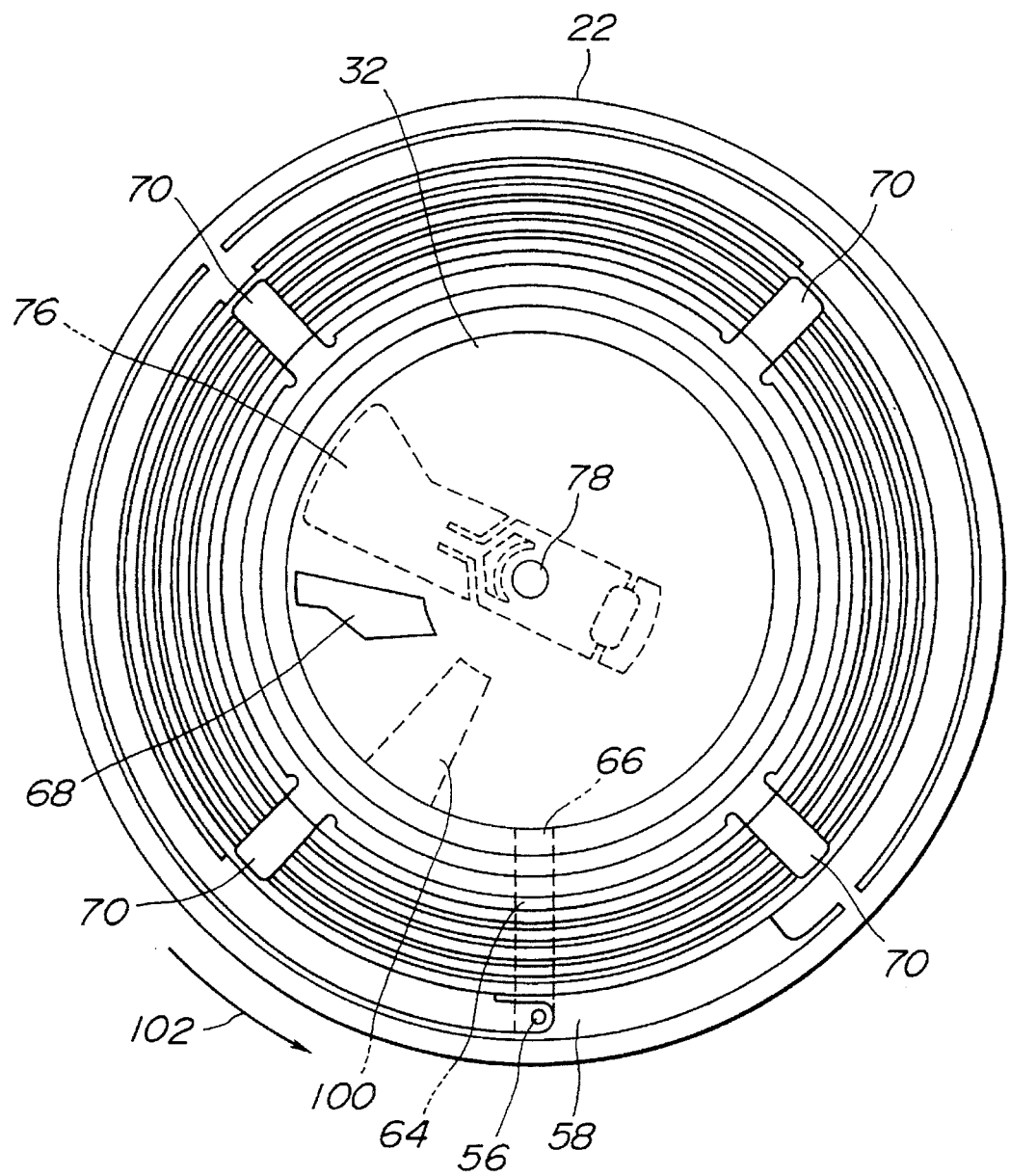
FIG. 2 is a rear end view a front wall with a divider wall.
Figure 3:
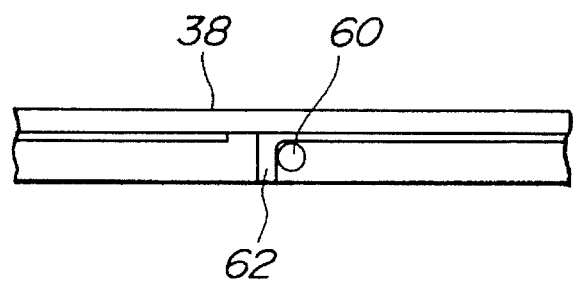
FIG. 3 is a fragmentary side view of a clutch plate.

Referring to FIGS. 1 and 2, a baffle wall or structure 100 is secured at its radially outermost end to the cylindrical wall of the circular cavity 50 and at its axially innermost end to the bottom wall of the cylindrical cavity 50. The baffle wall 100 is disposed adjacent and on the trailing side of the return port 66, with respect to rotation of the housing 12, the rotation being in the direction as indicated by an arrow 102 in FIG. 2, and disposed on the leading side, with respect to the rotational direction 102, of the inlet port 68 formed in the divider wall 32. The baffle wall 100 extends radially inwardly into the reservoir toward the center thereof and also extends toward the divider wall 32. With this arrangement, even if there is a great increase in supply of fluid out of the return port 66 into the reservoir 54 owing to a rapid increase in rotational speed of the drive shaft 20, the baffle wall 100 impedes the transmission of this increase to the inlet port 68 in the divider wall 32.

So long as the vehicle engine, not shown, is in operation, the drive shaft 20 and the associated clutch plate 38 will be driven at an appropriate speed ratio with respect to engine speed. The initial position of the temperature responsive valve member 76 will be closed across the inlet port 68 in the divider wall 32, and will remain closed so long as the engine is cold, thus preventing any flow of fluid from the reservoir 54 into the operating chamber 40. Since the pump outlet opening 56 is always open, providing continuous communication between the operating chamber 40 and the return passage 64, fluid will be pumped therethrough and, then, radially inwardly through the return passage 64 to spill over the return port 66 into the reservoir 54.

As the ambient temperature increases due to the warmup of the radiator and engine, the bimetallic thermostatic valve control element 88 will begin to wind up and, since it is restrained at its outer end by the post 94, its inner end 90 will rotate the center pin 80 and the valve member 76, progressively uncovering the inlet port 68. As a result, fluid will flow through the inlet port 68 back into the operating chamber 40 in a progressively increasing volume with increasing temperature. As the fluid is admitted to the operating chamber 40, filling the shear space between the cooperating annular ridge and groove elements 42 and 44, the shear-type fluid drive therebetween will be influenced and slip speed, or the difference in speed between that of the clutch plate 38 and the housing 12, will decrease. The pump will continue to promote circulation of fluid from the operating chamber 40 through the pump outlet opening 56 to the return passage 64 and then to the reservoir 54 at a point adjacent the baffle wall 100, from when it will flow through the reservoir 54 past the innermost edge of the baffle wall 100 and return to the operating chamber 40 via the variably opening inlet port 68.

When the cooling requirements are at a maximum, the temperature responsive valve member 76 will have rotated completely away from the inlet port 68, causing the relatively rotatable clutch plate 38 and the housing 12 to rotate at minimum slip speed and thereby effecting a maximum cooling function.

With this arrangement, even if there is a great increase in supply of fluid out of the return port 66 into the reservoir 54 owing to a rapid increase in rotational speed of the drive shaft 20, the baffle wall 100 impede the transmission of this increase to the inlet port 68 in the divider wall 32. Thus, undesired overshoot of the housing 12 can be avoided or at least suppressed.

Figure 4:
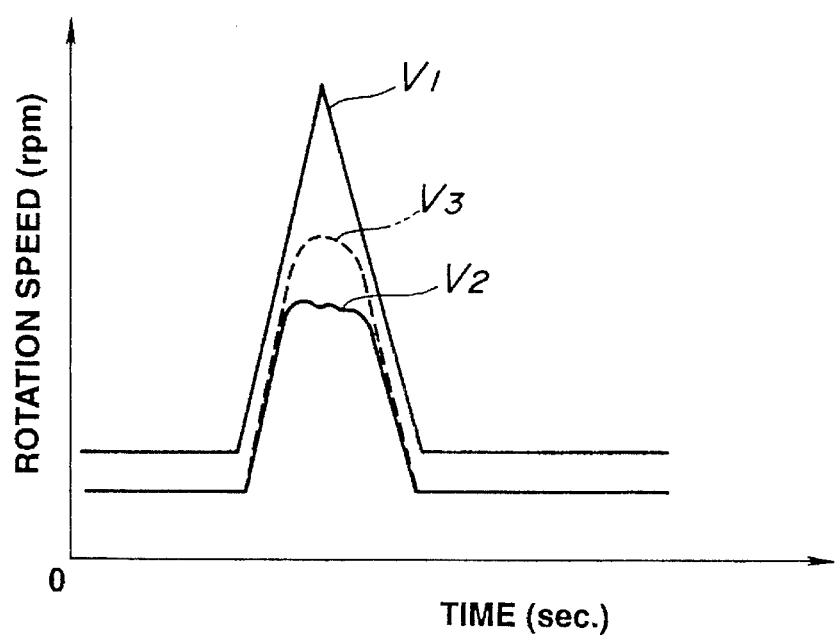
FIG. 4 is a diagrammatic chart showing the overshoot characteristic of the viscous fluid clutch.

In FIG. 4, the curve V1 shows a change in rotational speed of the clutch plate 38. Under this condition, the effect of the baffle wall 100 has been confirmed. The curve V2 shows the variation in rotational speed of the housing 12 according to the viscous clutch described in the preceding description, while the curve V3 shows the variation in rotational speed of the housing 12 with the baffle wall 100 removed. From this, it will be appreciated that the provision of the baffle wall 100 is effective in suppressing the overshoot phenomena of the housing 12.

Since supply of fluid through the inlet port 68 into the operating chamber 40 is controlled owing to the provision of the baffle wall 100, excessive rotation of the housing 12 and thus the associated fan is avoided upon rapid increase in engine speed, thus effectively suppressing fan noise and power loss during engine operation requiring rapid increase in engine speed.

What is claimed is:

1. A viscous fluid clutch comprising:

first and second relatively rotatable drive means, said first drive means containing a fluid medium and having an operating chamber and a reservoir;

fluid shear drive means located in said operating chamber operable with said fluid medium to provide a shear-type fluid drive between said first and second drive means;

said operating chamber having an outlet opening at an outer portion and an inlet opening at an inner portion, said first drive means having passage means having an inlet connected to said outlet opening and an outlet connected to said reservoir in a zone angularly spaced from and leading said inlet opening with respect to direction of rotation of said first drive means, pump means for pumping said fluid medium from said operating chamber out of said outlet opening and through said passage means and said outlet thereof to said reservoir; and means within said reservoir for impeding flow of said fluid medium from said outlet of said passage means to said inlet opening.

2. A viscous fluid clutch as claimed in claim 1, wherein said flow impending means is in the form of a wall secured to said first drive means and disposed adjacent said outlet of said passage means.

3. A viscous fluid clutch comprising:

first and second relatively rotatable drive members, said first drive member including a first wall, a second wall and a divider wall secured for rotation with said first and second walls so as to form a reservoir between said first and divider walls and an operating chamber between said divider and second walls;

fluid shear drive means on said first and second drive members in said operating chamber operable with a fluid medium to provide a shear type fluid drive therebetween;

said first drive member having a passage having an inlet and an outlet delivering fluid to said reservoir, first opening means for providing communication from said operating to said inlet of said passage;

pump means on one of said drive members for causing said fluid medium to flow from said operating chamber through said first opening means to said inlet of said passage;

second opening means formed in said divider wall for communicating said fluid medium from said reservoir to said operating chamber; and baffle wall means connected to said first wall of said first drive member and located in said reservoir between said outlet of said passage and said second opening means for restraining flow of said fluid medium from said outlet of said passage to said second opening means.

4. A viscous fluid clutch comprising:

an input shaft;

a clutch plate secured to said input shaft;

a fluid clutch housing rotatably mounted on said input shaft;

a cover member secured to said housing;

a divider wall secured for rotation with said cover member and said housing so as to form a reservoir width said cover member and a operating chamber with said housing;

said cover member defining a passage having an inlet and an outlet, a first opening formed in said cover member and communicating with said operating chamber;

pump means for pumping a fluid medium from said operating chamber through said first opening to said inlet of said passage;

a second opening formed in said divider wall and communicating said fluid medium from said reservoir to said operating chamber;

temperature responsive valve means operatively connected to said divider wall for controlling the flow of said fluid medium through said second opening; and baffle wall means connected to said cover member and located in said reservoir between said outlet of said passage and said second opening for restraining flow of said fluid medium to said second opening.

* * * * *